United States Patent
Olson et al.

[11] Patent Number: 5,937,826
[45] Date of Patent: Aug. 17, 1999

[54] APPARATUS FOR CONTROLLING A FUEL SYSTEM OF AN INTERNAL COMBUSTION ENGINE

[75] Inventors: David Olson; Keith L. Musser, both of Columbus; Stephen West, Greenwood; Shyamala Raghunathan, Columbus; Jonathan A. Stavnheim, Columbus, all of Ind.

[73] Assignee: Cummins Engine Company, Inc., Columbus, Ind.

[21] Appl. No.: 09/033,338

[22] Filed: Mar. 2, 1998

[51] Int. Cl.⁶ .............................. F02M 7/00; F02M 41/00
[52] U.S. Cl. ...................... 123/447; 123/458; 123/198 D
[58] Field of Search ..................... 123/365, 357, 123/359, 198 D, 198 DB, 446, 447, 458

[56] References Cited

U.S. PATENT DOCUMENTS

| | | |
|---|---|---|
| 4,509,480 | 4/1985 | Kull et al. |
| 4,515,125 | 5/1985 | Buck et al. |
| 4,534,328 | 8/1985 | Fischer et al. |
| 4,559,914 | 12/1985 | Flaig et al. |
| 4,582,952 | 4/1986 | Flaig et al. |
| 4,589,392 | 5/1986 | Wirz |
| 4,741,650 | 5/1988 | Wazaki et al. |
| 4,791,900 | 12/1988 | Buck et al. |
| 4,791,904 | 12/1988 | Grieshaber et al. |
| 4,793,308 | 12/1988 | Brauninger et al. |
| 4,847,771 | 7/1989 | Scarnera |
| 4,877,101 | 10/1989 | Tada et al. |
| 4,899,713 | 2/1990 | Nakamura |
| 4,957,083 | 9/1990 | Nakaniwa et al. |
| 4,989,562 | 2/1991 | Ohkumo et al. |
| 5,201,294 | 4/1993 | Osuka ....................... 123/458 |
| 5,235,949 | 8/1993 | Wahl et al. |
| 5,241,933 | 9/1993 | Morikawa ............... 123/198 D |
| 5,388,562 | 2/1995 | Sekiguchi et al. |
| 5,535,721 | 7/1996 | Lewis et al. |
| 5,619,969 | 4/1997 | Liu et al. |
| 5,638,801 | 6/1997 | Maki et al. |
| 5,638,802 | 6/1997 | Maki et al. |
| 5,678,521 | 10/1997 | Thompson ................. 123/447 |
| 5,720,262 | 2/1998 | Antonioli et al. ........ 123/458 |
| 5,727,515 | 3/1998 | Biester ................... 123/198 D |
| 5,771,865 | 6/1998 | Ishida .......................... 123/447 |

*Primary Examiner*—Thomas N. Moulis
*Attorney, Agent, or Firm*—Beck, Michael & Beck, P.C.

[57] ABSTRACT

A fuel system includes an electronically controllable high pressure fuel pump operable to supply high pressure fuel from a lower pressure fuel source to a high pressure fuel collection chamber having a pressure sensor associated therewith. The fuel collection chamber feeds an electronically controllable valve operable to dispense the high pressure fuel to a fuel distribution unit supplying fuel to a number of fuel injectors. A control computer is provided for controlling the high pressure fuel pump and valve in response to requested fueling, engine speed and fuel pressure provided by the pressure sensor. The control computer is normally operable to drive the fuel pump as a function of fuel pressure and a reference pressure, which is based on requested fueling, and to control the valve as a function of commanded fueling, which is a function of engine speed and a reference speed based on requested fueling, and fuel pressure. In a first limp home mode, the control computer is operable to drive the fuel pump as a function of fuel pressure and commanded fueling if abnormal operation of the high pressure fuel pump is detected. In this mode, the valve is controlled only as a function of fuel pressure. In a second limp home mode, the control computer is operable to drive the fuel pump with a predicted fuel pump command based on the fuel command and engine speed, if abnormal operation of the pressure sensor is detected. In this mode, the valve is controlled as a function of the fuel command and the reference pressure or a default pressure.

35 Claims, 7 Drawing Sheets

APPARATUS FOR CONTROLLING A FUEL SYSTEM OF AN INTERNAL COMBUSTION ENGINE

FIELD OF THE INVENTION

The present invention relates generally to fuel system control techniques, and more specifically to techniques for controlling a fuel system in response to detected fuel system faults.

BACKGROUND OF THE INVENTION

Electronically controlled high pressure fuel systems are known and commonly used in the automotive and heavy duty truck industries. Such systems typically include a fuel pump operable to provide high pressure fuel to a collection unit that supplies the pressurized fuel to one or more fuel injectors. One or more pressure sensors are typically provided for monitoring and controlling the fuel pressure throughout the system.

An example of one such system is described in U.S. Pat. No. 5,678,521 to Thompson et al., which is assigned to the assignee of the present invention. The Thompson et al. fuel system includes a pair of cam driven high pressure fuel pumps operable to pump fuel from a low pressure fuel source to an accumulator. The accumulator passes the high pressure fuel to a single injection control valve which is electronically controllable to supply the fuel to a distributor unit. The distributor, in turn, distributes the fuel to any of a number of fuel injectors. The accumulator includes a pressure sensor for monitoring accumulator pressure. An electronic control unit monitors accumulator pressure, throttle position and engine speed, and is operable to control the operation of the fuel system in accordance therewith.

High pressure fuel systems of the type just described, while having many advantages over prior mechanical systems, have certain drawbacks associated therewith. For example, while fuel pumping and pressure sensor related faults and failures may be detectable in such systems, no known provisions have been made heretofore for controlling the high pressure pump(s) under such conditions. If left uncontrolled, overpumping and/or overfueling could occur which, in the extreme, could result in fuel system and/or engine damage, and one common technique for addressing such failures is to shut the engine down. However, while this approach avoids potential damage to the engine and/or components, it unnecessarily strands both the vehicle and occupant(s).

What is therefore needed in an electrically controlled high pressure fuel system are techniques for controlling the one or more high pressure fuel pumps and fuel injection strategies under failure conditions associated with the fuel pump and pressure sensor to avoid unnecessary engine shut down. Such techniques should ideally direct the fuel control system to enter limp home fueling modes in response to either pressure sensor or fuel pumping related failure conditions.

SUMMARY OF THE INVENTION

The foregoing shortcomings of the prior art are addressed by the present invention. In accordance with one aspect of the present invention, an apparatus for controlling a fuel system of an internal combustion engine comprises means for producing a fueling request, means responsive to the fueling request for producing a reference pressure, means responsive to the reference pressure for producing a pump command signal, a fuel pump responsive to the pump command signal for providing high pressure fuel from a lower pressure fuel source, means responsive to the fueling request for producing a fuel command, means for sensing engine speed and producing an engine speed signal corresponding thereto, and means responsive to the fuel command and the engine speed signal for replacing the reference pressure with the fuel command in the means for producing the pump command signal if the fuel command exceeds a fuel threshold value while the engine speed signal exceeds a speed threshold level.

In accordance with another aspect of the present invention, an apparatus for controlling a fuel system of an internal combustion engine comprises means for producing a fueling request, means for sensing pressure of pressurized fuel in a fueling system and producing pressure signal corresponding thereto, means responsive to the fueling request and the pressure signal for producing a pump command signal, a fuel pump responsive to the pump command signal for providing high pressure fuel from a lower pressure fuel source, means responsive to the fueling request for producing a fuel command, means for sensing engine speed and producing an engine speed signal corresponding thereto, and means responsive to the pressure signal for replacing the pump command signal to the fuel pump with a predicted pump command signal if the pressure signal indicates abnormal operation of the means for sensing pressure.

In accordance with a further aspect of the present invention, an apparatus for controlling a fuel system of an internal combustion engine comprises a high pressure fuel pump responsive to a pump command signal for providing high pressure fuel from a lower pressure source of fuel, an accumulator receiving the high pressure fuel from the fuel pump and collecting the high pressure fuel therein, means for sensing engine speed and producing an engine speed signal corresponding thereto, and a control computer responsive to a fuel request signal and the engine speed signal to produce a fuel command, the control computer producing the pump command signal as a function of the fuel command if the fuel command exceeds a fuel threshold level while the engine speed signal is in excess of a speed threshold level.

In accordance with yet another aspect of the present invention, an apparatus for controlling a fuel system of an internal combustion engine comprising a high pressure fuel pump responsive to a pump command signal for providing high pressure fuel from a lower pressure source of fuel, an accumulator receiving the high pressure fuel from the fuel pump and collecting the high pressure fuel therein, means for sensing fuel pressure within the accumulator and producing a pressure signal corresponding thereto, means for producing a fuel request signal, means for sensing engine speed and producing an engine speed signal corresponding thereto, and a control computer responsive to the fuel request signal to produce a fuel command, the control computer responsive to an abnormality in the pressure signal to provide the pump command signal as a function of the engine speed signal and the fuel command.

One object of the present invention is to provide an electronically controlled fuel system with a first limp home operational mode upon detection of abnormal operation of a high pressure fuel pump forming part of the fuel system.

Another object of the present invention is to provide the fuel system with a second limp home operational mode upon detection of abnormal operation of a pressure sensor forming part of the fuel system.

These and other objects of the present invention will become more apparent from the following description of the preferred embodiment.

DESCRIPTION OF THE PREFERRED EMBODIMENT

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 1:
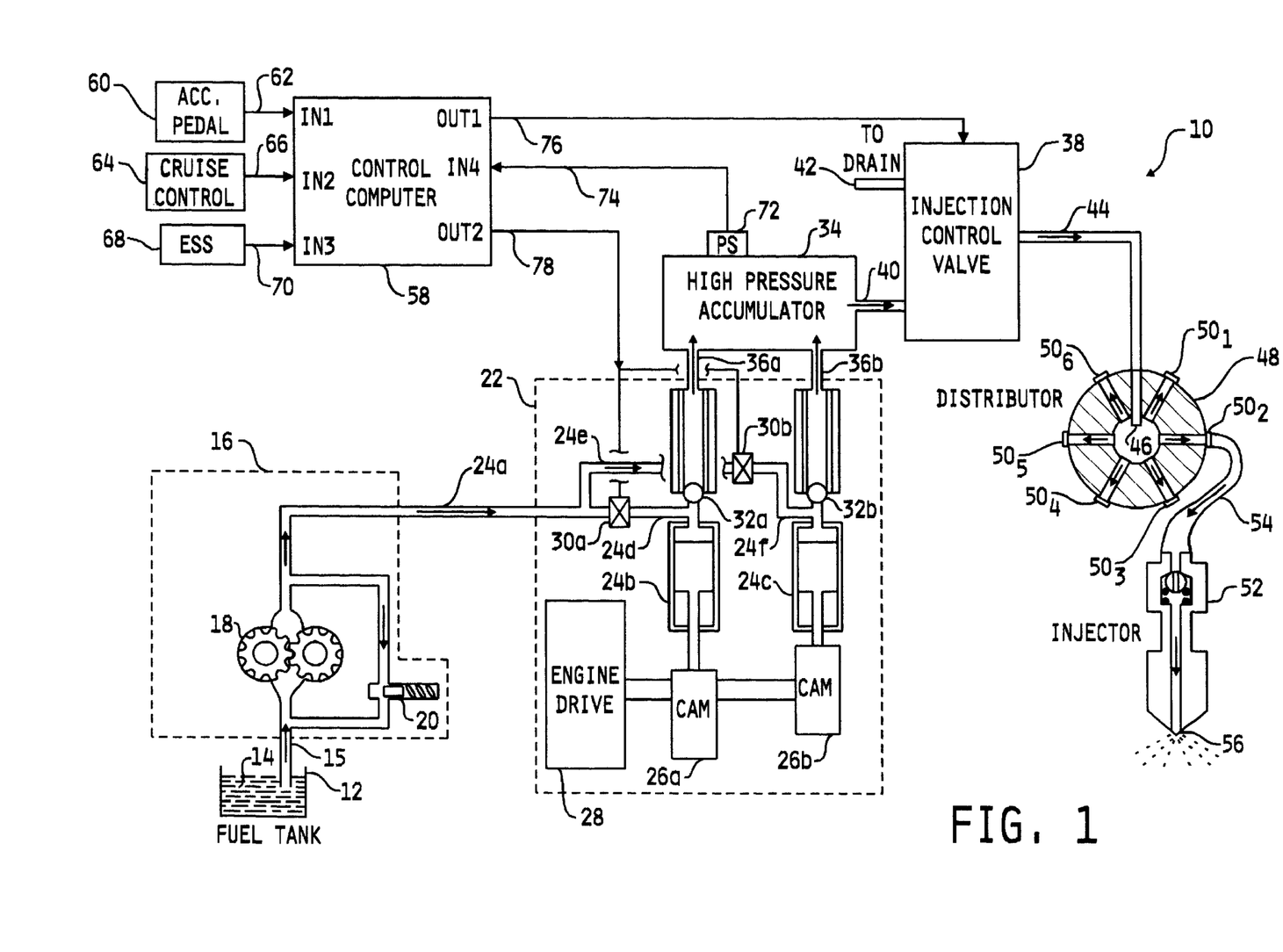
FIG. 1 is a diagrammatic illustration of a fuel system for an internal combustion engine and associated control system, in accordance with the present invention.

Referring now to FIG. 1, a fuel system and associated control system 10, in accordance with the present invention, is shown. System 10 includes a fuel tank 12 or similar source of fuel 14 having a fuel flow path 15 extending into a low pressure fuel pump 16. Preferably, low pressure pump 16 is a known gear pump having a manually gear mechanism 18 and fuel pressure regulator 20. A fuel flow conduit 24a extends into a high pressure fuel pump 22 having a first (front) pump element 24b and a second (rear) pump element 24c. Pump elements 24b and 24c are mechanically driven by an engine drive mechanism 28 via cams 26a and 26b respectively. Fuel flow conduit 24a feeds a first pump control valve 30a having an output fuel flow conduit 24d connected to pump element 24b. Fuel flow conduit 24a is also connected to a fuel flow conduit 24e which feeds a second pump control valve 30b having an output fuel flow conduit 24f connected to pump element 24c. The first pump element 24b is connected to a high pressure fuel accumulator 34 via conduit 36a with a check valve 32a disposed therebetween. Likewise, the second pump element 24c is connected to accumulator 34 via conduit 36b with a check valve 32b disposed therebetween.

High pressure accumulator 34 is connected to an injection control valve 38 via conduit 40. Injection control valve 38 includes a drain conduit 42 and an output conduit 44 feeding an input 46 of a fuel distributor 48. Distributor 48 includes a number of output ports, wherein six such output ports $50_1$–$50_6$ are illustrated in FIG. 1. It is to be understood, however, that distributor 48 may include any number of output ports for distributing fuel to a number of fuel injectors or groups of fuel injectors. In FIG. 1, one such fuel injector 52 is connected to output port $50_2$ via fuel flow path 54, wherein injector 52 has an injector output 56 for injecting fuel into an engine cylinder.

System 10 is electronically controlled by a control computer 58 in response to a number of sensor and engine/vehicle operating conditions. An accelerator pedal 60 preferably includes an accelerator pedal position sensor (not shown) providing a signal indicative of accelerator pedal position or percentage to input IN1 of control computer 58 via signal path 62, although the present invention contemplates utilizing any known sensing mechanism to provide control computer 58 with a fuel demand signal from accelerator pedal 60. A known cruise control unit 64 provides a fuel demand signal to input IN2 of control computer 58 via signal path 66 indicative of desired vehicle speed when cruise control operation is selected as is known in the art.

An engine speed sensor 68 is connected to an input IN3 of control computer 58 via signal path 70, providing control computer 58 with a signal indicative of engine speed position. In one embodiment, engine speed sensor 68 is a known HALL effect sensor, although the present invention contemplates using any known sensor operable to sense engine speed and preferably engine position, such as a variable reluctance sensor. High pressure accumulator 34 includes a pressure sensor 72 connected thereto which is operable to sense pressure within the accumulator 34. Pressure sensor 72 provides a pressure signal indicative of accumulator pressure to input IN4 of control computer 58 via signal path 74. Preferably, pressure sensor 72 is a known pressure sensor, although the present invention contemplates utilizing any known device, mechanism or technique for providing control computer 58 with a signal indicative of fuel pressure within accumulator 34, conduit 36a, conduit 36b or conduit 40. Control computer 58 also includes a first output OUT1 connected to injection control valve 38 via signal path 76 and a second output 78 connected to pump control valves 30a and 30b via signal path 78. The general operation of fuel system 10 and associated control system will be described with reference to FIGS. 1–4.

Figure 2:
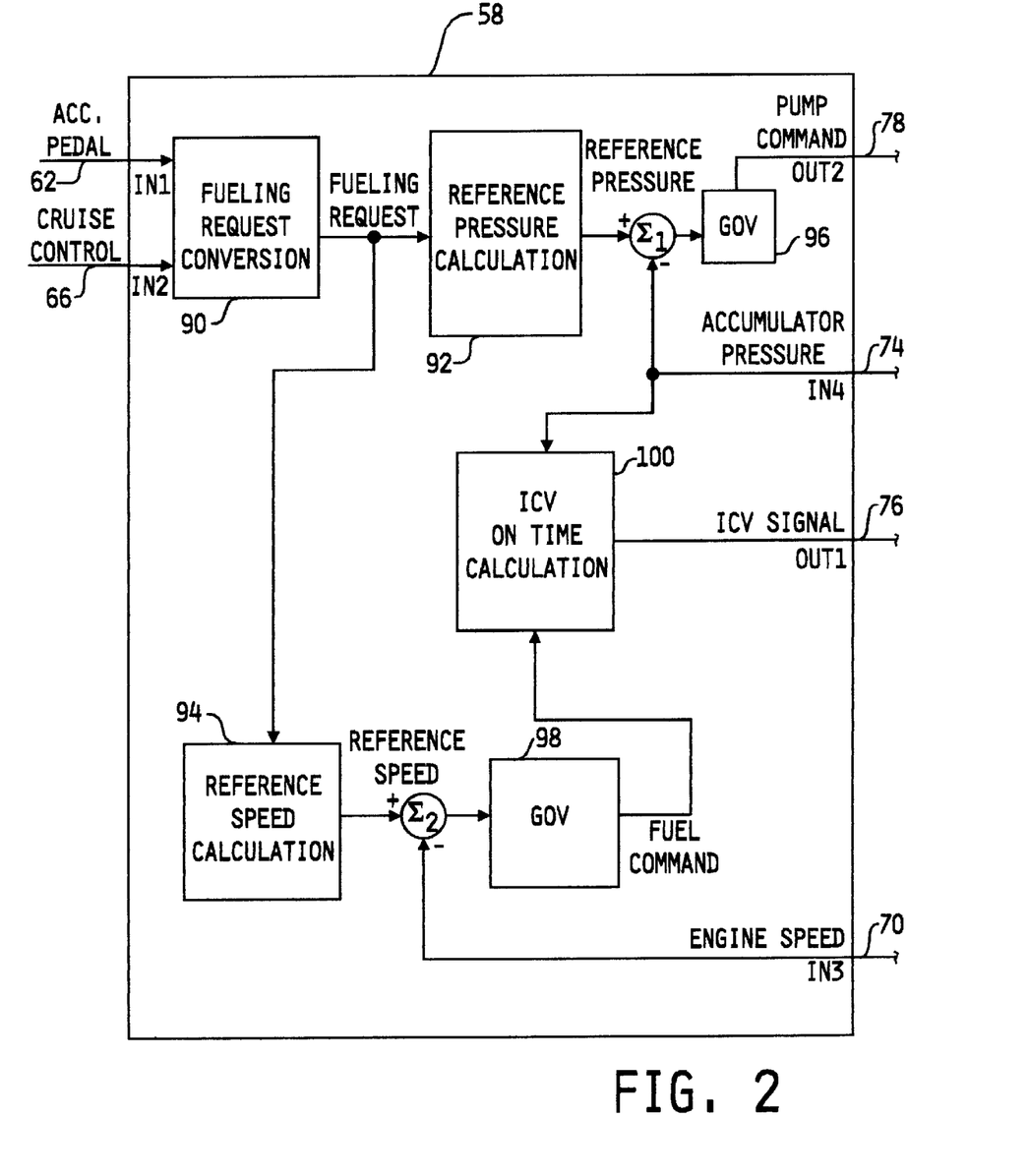
FIG. 2 is a block diagram illustration of some of the internal features of the control computer of FIG. 1 under normal operation thereof, as they relate to the present invention.

Referring to FIGS. 1 and 2, some of the internal features of control computer 58, as they relate to the present invention, are illustrated. The accelerator pedal signal and cruise control signal enter control computer 58 via signal paths 62 and 66 respectively. As is known in the art, both signals are operator originated in accordance with desired fueling, and control computer 58 is responsive to either signal to correspondingly control the fuel system 10. Hereinafter, the accelerator pedal and/or cruise control signal will be referred to generically as a fuel demand signal. In any case, the fuel demand signal is provided to a fueling request conversion block 90 which converts the fuel demand signal to a fueling request signal in accordance with known techniques. Typically, fueling request conversion block 90 includes a number of fuel maps and is responsive to a number of engine/vehicle operating conditions, in addition to the fuel demand signal, to determine an appropriate fueling request value.

The fueling request value is provided to a reference pressure calculation block 92 which is responsive to the fueling request value to determine a reference pressure indicative of a desired accumulator pressure setpoint. The reference pressure is provided to an accumulator pressure control loop which provides a pump command signal on signal path 78 based on the reference pressure value and accumulator pressure provided by pressure sensor 72 on signal path 74. In one embodiment, the reference pressure value is provided to a positive input of a summing node $\Sigma_1$ which also has a negative input connected to signal path 74. An output of summing node $\Sigma_1$ is provided to a governor block 96, the output of which is connected to signal path 78. In one embodiment, governor block 96 includes a known PID governor, although the present invention contemplates utilizing other known governors or governor techniques.

The fueling request value is also provided to a reference speed calculation block 94 which is responsive to the fueling request value to determine a reference speed indicative of a desired engine speed. The reference speed is provided to an engine speed control loop which produces a fuel command value in accordance therewith, as is known in the art, based on the reference speed and actual engine speed provided by engine speed sensor 68 on signal path 70. In one embodiment, the reference speed value is provided to a positive input of a summing node $\Sigma_2$ which also has a negative input connected to signal path 70. An output of summing node $\Sigma_2$ is provided to a governor block 98, the output of which provides the fuel command value. In one embodiment, governor block 98 includes a known PID governor, although the present invention contemplates utilizing other known governors or governor techniques.

Control computer 58 also includes an ICV on time calculation block 100 which is operable to determine an "on time" for activating the injection control valve (ICV) 38 based on the actual accumulator pressure signal provided on signal path 74 and the fuel command provided by governor 98. The ICV on time calculation block 100 produces a fuel signal, or ICV signal, on signal path 76 for controlling activation/deactivation of the injector control valve 38.

Referring now to FIG. 3, which is composed of FIGS. 3A–3G, some of the general timing events of fuel system 10 are illustrated. Control computer 58 is operable to control fuel pressure within the accumulator 34 by controlling the pump control valves 24b and 24c. Control of one of the valves 24b will now be described, although it is to be understood that operation thereof applies identically to valve 24c. As the pump plunger retract within the pump element 24b under the action of cam 26a, fuel supplied by low pressure fuel pump 16 flows into the trapped volume of fuel pump element 24b as long as valve 30a is not energized. If valve 30a remains deenergized as the pump plunger rises, fuel within the trapped volume flows back out to low pressure fuel pump 16. When the pump control valve 30a is energized, the outward fuel flow path is closed and the fuel within the trapped volume of pump element 24b becomes pressurizes as the pump plunger rises. When the fuel pressure within the trapped volume reaches a specified pressure level, check valve 32a opens and the pressurized fuel within the trapped volume flows into the accumulator. Based upon a difference between the reference pressure (block 92 of FIG. 2) and the actual accumulator pressure (provided on signal path 74), the pressure control loop of FIG. 2 specifies the angle before pump plunger top dead center (TDC) at which the pump control valve 30a is energized. This angle will be referred to hereinafter as a valve close angle (VCA).

Figure 3A:
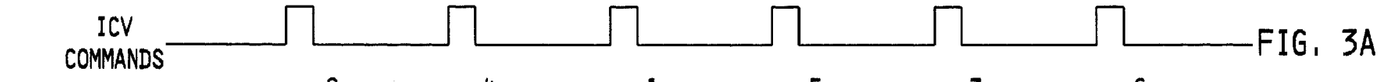
FIG. 3 is composed of FIGS. 3A–3G and illustrates waveform diagrams of normal operation of the fuel system and associated control system of FIG. 1.
Figures 3B, 3C:
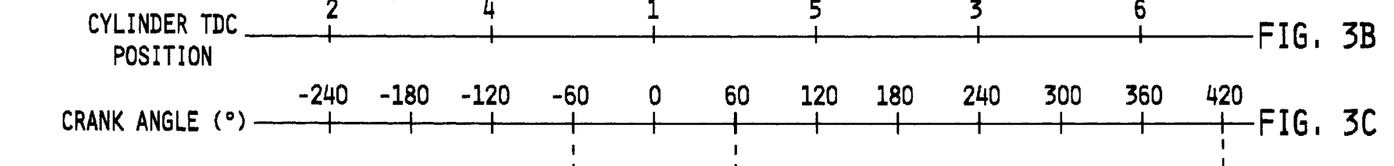
Figure 3D:
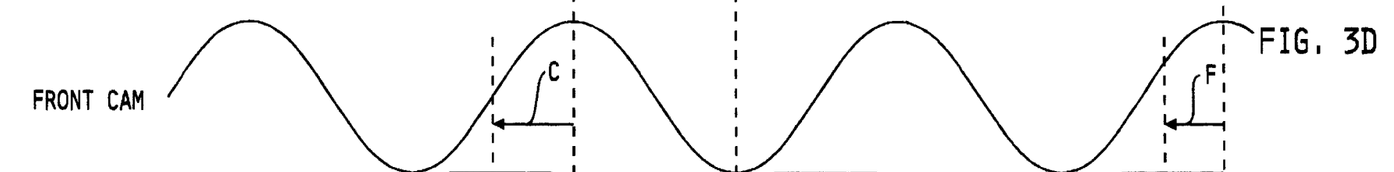
Figure 3E:
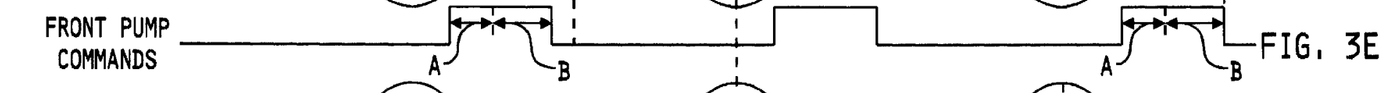
Figure 3F:
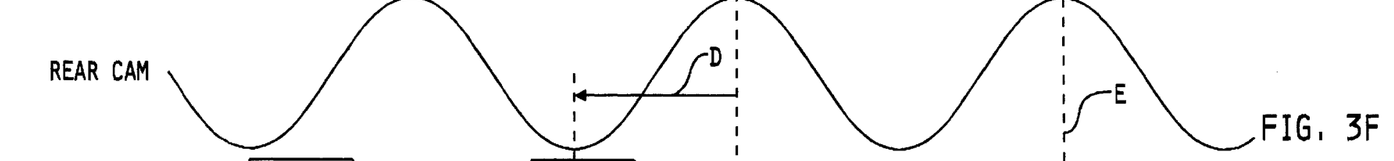
Figure 3G:
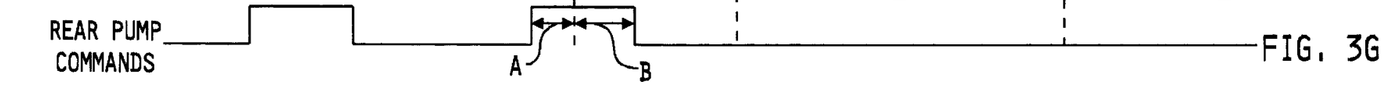

In one embodiment of fuel system 10, as illustrated in FIGS. 3B–3G, pump plunger TDC (shown in FIGS. 3D and 3F as front and rear cam respectively) and cylinder TDC (FIG. 3B) are aligned 60 crank degrees apart (FIG. 3C). The commanded VCA (pump command) may occur anywhere between zero and 120 degrees before pump plunger TDC (see FIGS. 3D–3G). When the difference between the reference pressure and actual accumulator pressure is large, the respective commanded VCA is large and vice versa. Examples of different commanded VCA's are illustrated in FIGS. 3E and 3G wherein pump command activation times are shown as having a pump activation delay time A and a pump activation time B. VCA's corresponding to 65 degrees and 30 degrees are shown in FIG. 3E by C and F respectively, and a VCA of 120 degrees is shown in FIG. 3G by D. If the actual accumulator pressure is greater than the reference pressure, the commanded VCA is automatically set at zero degrees, corresponding to no energization of the pump control valve 30a, as illustrated at E in FIG. 3G. Control computer 58 is further operable to activate the injection control valve 38 (to control fuel timing) and deactivate valve 38 (to control fueling amount) between pump plunger TDC and cylinder TDC as illustrated in FIGS. 3A, 3B, 3D and 3F. Further operational and structural details of fuel system 10 and associated control system are given in U.S. Pat. No. 5,678,521 to Thompson et al., which is assigned to the assignee of the present invention, the contents of which are incorporated herein by reference.

Figure 4:
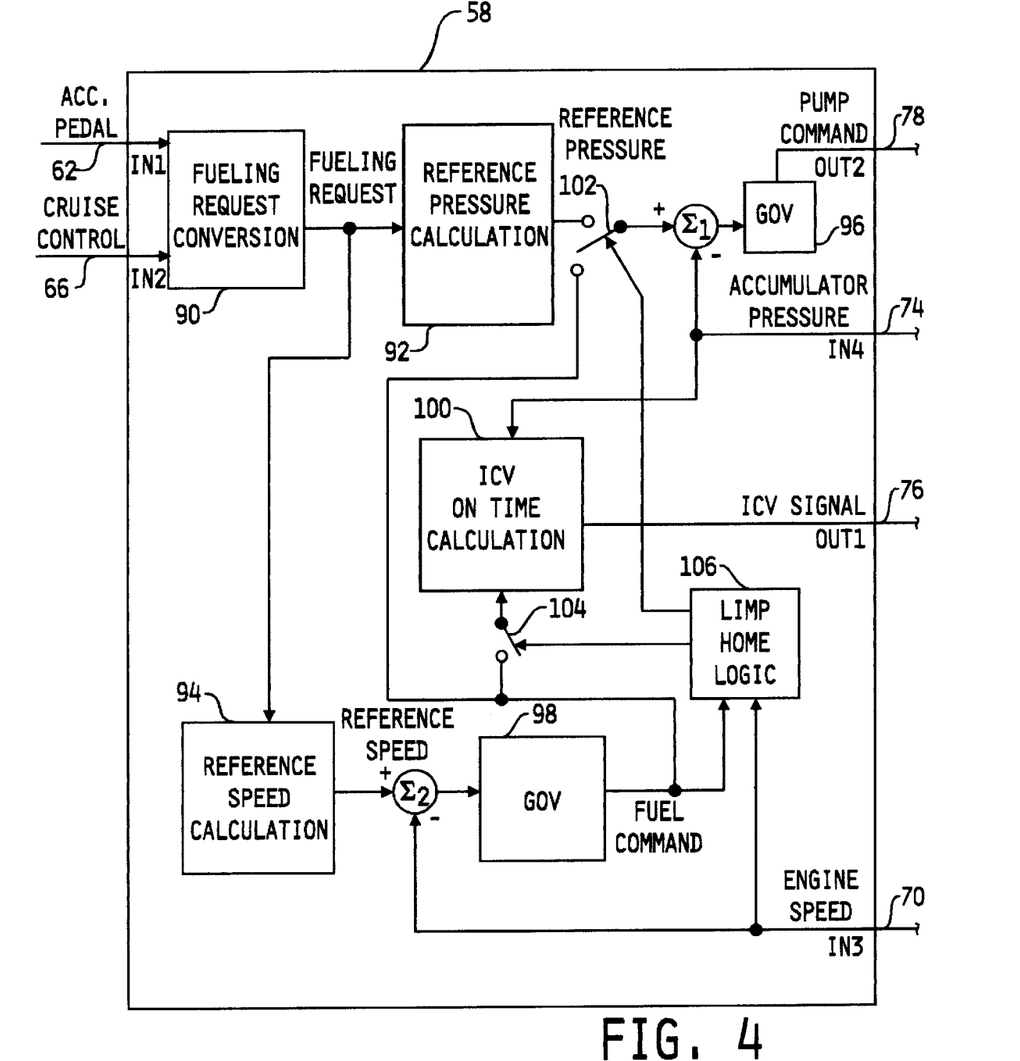
FIG. 4 is a block diagram illustration of some of the internal features of the control computer of FIG. 1 under a limp home operational mode in response to detection of high pressure pump related failures, in accordance with the present invention.

In accordance with one aspect of the present invention, control computer 58 is operable to execute a limp home fueling algorithm in response to one or more failure conditions associated with the high pressure fuel pump 22 (FIG. 1), such as overpumping conditions which could result in overfueling of the engine and/or destruction of the accumulator 34. FIG. 4 is a block diagram similar to FIG. 2, and illustrates some of the internal features of control computer 58 as they relate to one preferred limp home fueling algorithm of the present invention. Many of the internal features of the control computer 58 illustrated in FIG. 4 are identical to those shown and described with respect to FIG. 2, and like numbers have therefore been used to designate like elements. For brevity, these identical features will not be described further here, except as they may relate to the pump failure related limp home fueling algorithm of the present invention.

In addition to the internal features shown and described with respect to FIG. 2, control computer 58 of FIG. 4 further includes a "switch" 102 connected between summing node $\Sigma_1$, reference pressure calculation block 92 and the engine speed governor 98. It is to be understood that the "switch" 102 is not a physical switch but is rather a software switch in the sense that control computer 58 may control, through a software program, the signal or value input to summing node $\Sigma_1$. In controlling switch 102, control computer 58 is operable to provide either the reference pressure value (sometimes referred to as the accumulator pressure setpoint value) or the fuel command value as the input to summing node $\Sigma_1$. The control computer 58 of FIG. 4 also includes a "switch" 104 connected between the ICV on time calculation block 100 and the engine speed governor 98. As with switch 102, it is to be understood that the "switch" 104 is not a physical switch but is rather a software switch in the sense that control computer 58 may control, through a software program, the signal or value input to the ICV on time calculation block 100. In controlling switch 104, control computer 58 is operable to either provide or remove the fuel command value as an input to the ICV calculation block 100. The control computer 58 of FIG. 4 also includes a limp home logic block 106 that receives as inputs the fuel command value from engine speed governor 98 and the engine speed signal provided on signal path 70, and controls switches 102 and 104 in accordance therewith.

Figure 5:
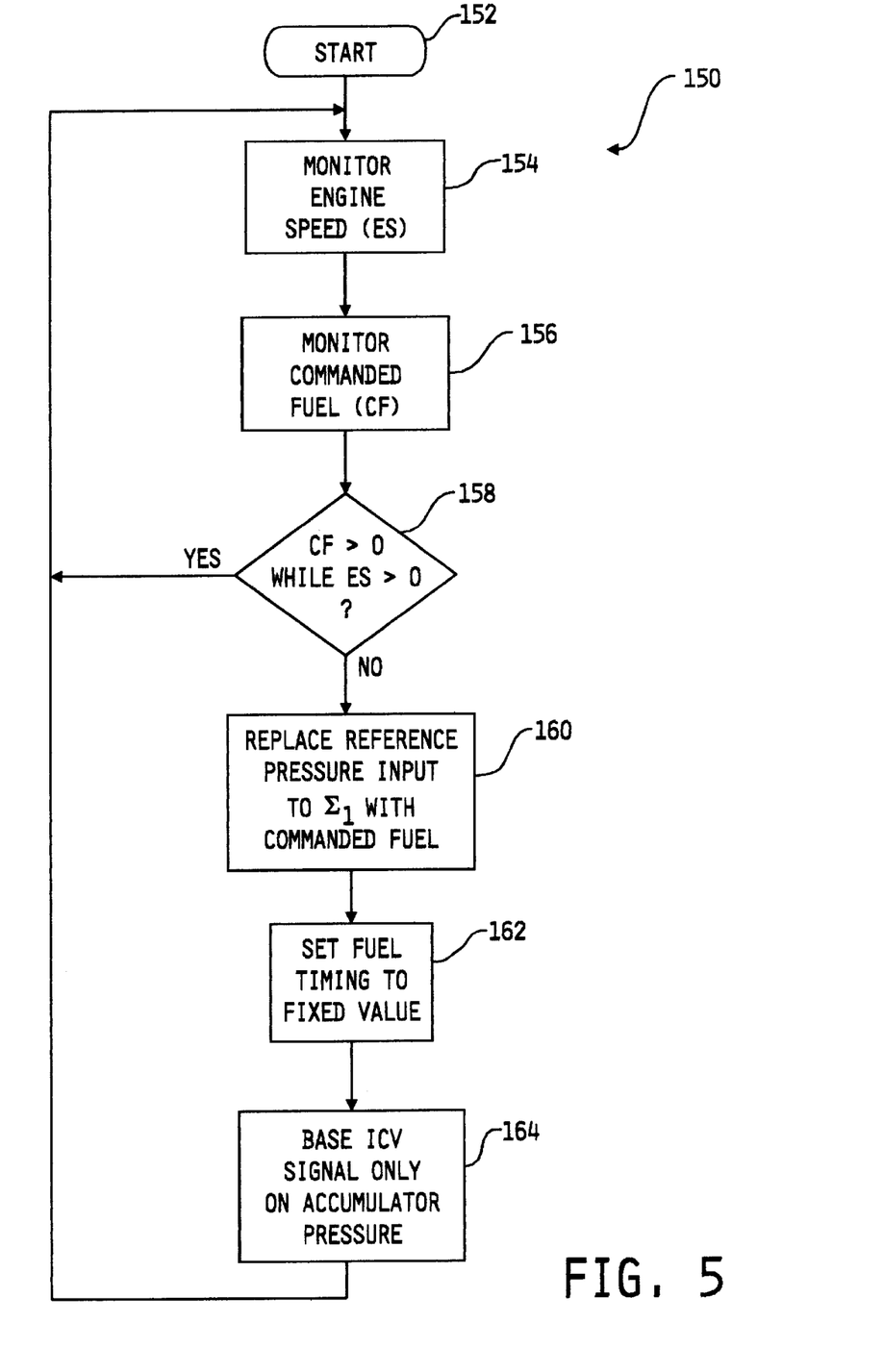
FIG. 5 is a flow chart illustrating one preferred embodiment of a software algorithm for controlling the fuel system in accordance with the block diagram of FIG. 4.

Referring now to FIG. 5, one preferred embodiment of a software algorithm 150 for executing a pump failure related limp home fueling technique of the present invention is shown. Preferably, control computer 58 includes algorithm 150 therein and is operable to execute algorithm many times per second as is known in the art. With reference to FIGS. 4 and 5, one preferred embodiment for executing a pump failure related limp home fueling technique will now be described in detail. Control computer 58 is preferably operable to determine whether a pump related failure condition exists in accordance with any known technique, although several specific techniques for determining such failures are detailed in pending U.S. patent application Ser. No. 09/033, 379 filed by Stavnheim et al. Entitled APPARATUS FOR DIAGNOSING FAILURES AND FAULT CONDITIONS IN A FUEL SYSTEM OF AN INTERNAL COMBUSTION ENGINE and assigned to the assignee of the present invention, the contents of which are incorporated herein by reference. Preferably, detection of any of such pump related failures are a precondition to executing algorithm 150, although the present invention also contemplates executing algorithm 150 continuously as a precaution against overpumping and/or overfueling.

Algorithm 150 begins at step 152 and at step 154, the limp home logic block 106 of control computer 58 is operable to monitor engine speed (ES), preferably by monitoring the engine speed signal provided by engine speed sensor 68 on signal path 70. Algorithm execution continues from step 154 at step 156 wherein the limp home logic block 106 of control computer 58 is operable to monitor commanded fuel (CF), preferably by monitoring the fuel command value provided by engine speed governor 98. Thereafter at step 158, the limp home logic block 106 of control computer 58 compares CF and ES with predefined threshold values to determine appropriate control of switches 102 and 104. In one embodiment, both threshold values are zero, although the present invention contemplates other threshold values, so logic block 106 compares CF and ES to zero. If CF is greater than zero while ES is greater than zero, algorithm execution loops back to step 154, indicating that an engine speed value greater than zero should cause the engine speed governor to produce a fuel command greater than zero as expected. If, however, logic block 106 determines at step 158 that CF is zero while ES is greater than zero, logic block assumes an overpumping or overfueling condition and advances to step 160 where logic block 106 controls switch 102 to replace the reference pressure input to summing node $\Sigma_1$ with the fuel command output of the engine speed governor 98. Thereafter at step 162, control computer 58 directs the ICV on time calculation block to set the fuel timing (the activation time of the ICV signal provided to injection control valve 38) to a fixed value. In one embodiment, control computer 58 executes step 162 by directing the ICV on time calculation block to activate the injection control valve 38 at the first available fueling window of distributor 48 for every injection event. It is to be understood, however, that the present invention contemplates fixing the fuel timing according to other reference indicators. In any event, algorithm execution continues from step 162 at step 164 where logic block 106 controls switch 104 to remove the fuel command as an input to the ICV on time calculation block 100. As a result, the ICV on time calculation is thereafter a function only of accumulator pressure. From step 164, algorithm execution loops back to step 154.

From the foregoing, it should now be apparent that the pump failure related limp home fueling mode of fuel system 10 is directed at controlling fueling in response to overpumping or overfueling conditions. Control computer 58 is operable in such a limp home fueling mode to monitor the fuel command output of the engine speed governor 98 and replace the reference pressure input to the summing node $\Sigma_1$ of the pressure control loop with the fuel command value, and also to remove the fuel command as an input to the ICV on time calculation block 100.

If the fuel command value is greater than zero while engine speed is greater than zero, then control computer 58 presumes that the increased fueling level is an attempt to increase engine speed. If, however, the fuel command is zero while engine speed is greater than zero, control computer 58 presumes that an overpumping or overfueling condition exists and replaces the reference pressure input to the pressure control loop with the fuel command value which is now zero. With a reference input of zero, the pressure control loop decreases the VCA of the pump command signal so that the accumulator pressure correspondingly drops. This, in turn, causes the engine speed to drop which then causes the fuel command to increase to a value slightly greater than zero, thereby causing the pressure control loop to increase the VCA of the pump command to increase the accumulator pressure. Eventually, this algorithm results in a relatively constant accumulator pressure over time which thus addresses overfueling and/or overpumping concerns. Under such control, the "on time" of the injection control valve should no longer be a function of both accumulator pressure and fuel command since accumulator pressure is essentially constant and the high pressure fuel pump is under control of the engine speed governor rather than a function of a computed accumulator pressure setpoint value. As a result, the fuel quantity supplied to distributor 48, as a result of the ICV signal provided by ICV on time calculation block 100, should be determined only by the available pressure in the accumulator 34.

Figure 6:
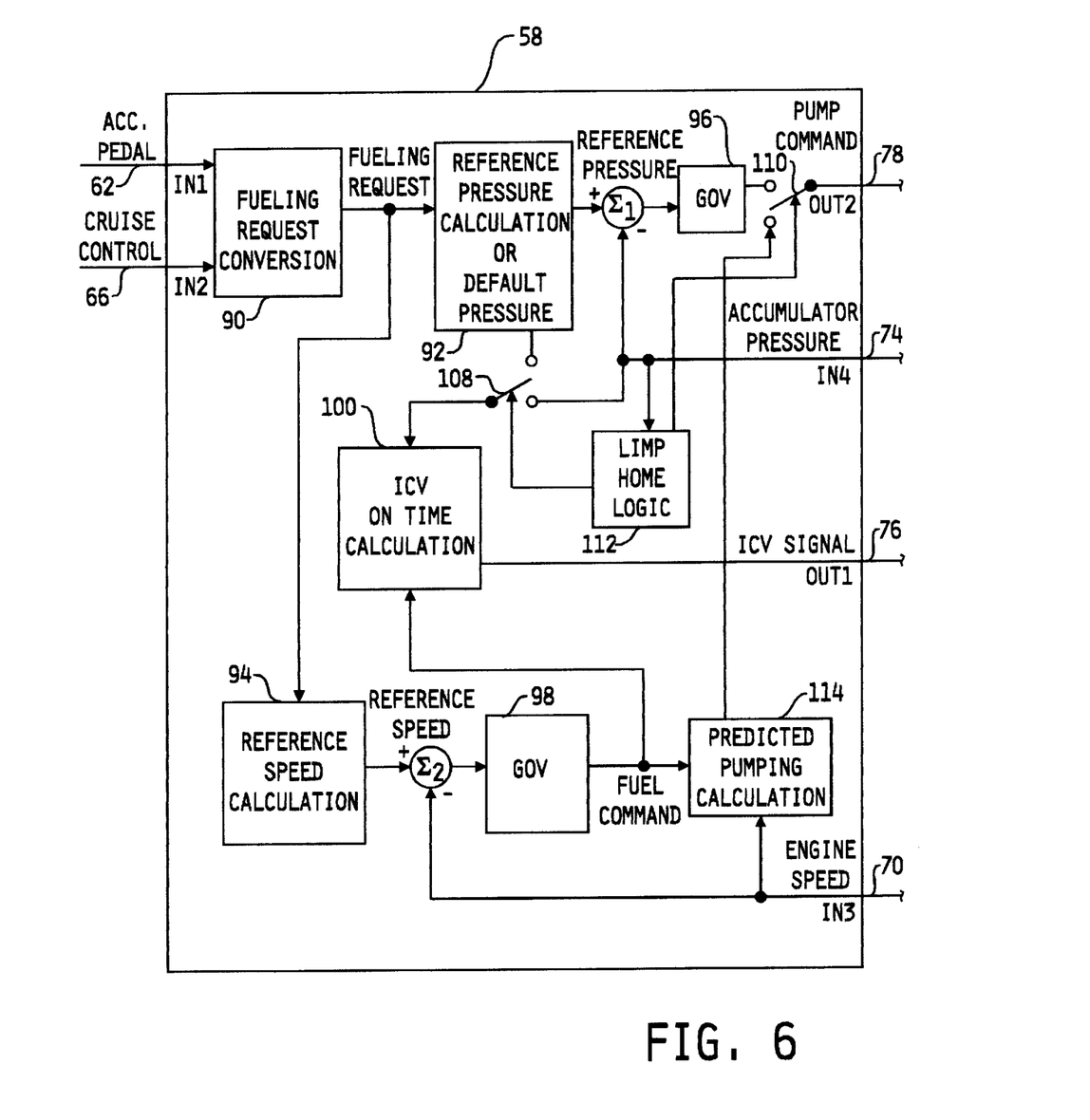
FIG. 6 is a block diagram illustration of some of the internal features of the control computer of FIG. 1 under another limp home operational mode in response to detection of fuel pressure sensor related failures, in accordance with the present invention.

In accordance with another aspect of the present invention, control computer 58 is operable to execute a limp home fueling algorithm in response to one or more failure conditions associated with the pressure sensor 72 (FIG. 1), including in range and out of range sensor failures. FIG. 6 is a block diagram similar to FIG. 2, and illustrates some of the internal features of control computer 58 as they relate to one preferred pressure sensor related limp home fueling algorithm of the present invention. Many of the internal features of the control computer 58 illustrated in FIG. 6 are identical to those shown and described with respect to FIG. 2, and like numbers have therefore been used to designate like elements. For brevity, these identical features will not be described further here, except as they may relate to the pump failure related limp home fueling algorithm of the present invention.

In addition to the internal features shown and described with respect to FIG. 2, control computer 58 of FIG. 6 further includes a "switch" 108 connected between the accumulator pressure signal input to control computer 58, reference pressure calculation block 92 and ICV on time calculation block 100. It is to be understood that the "switch" 108 is not a physical switch but is rather a software switch in the sense that control computer 58 may control, through a software program, the appropriate signal or value input to the ICV calculation block 100. In controlling switch 108, control computer 58 is operable to provide either the reference pressure value (sometimes referred to as the accumulator pressure setpoint value) or the accumulator pressure signal as the input to the ICV on time calculation block 100. The control computer 58 of FIG. 4 also includes a "switch" 110 connected between the pump command signal line 78, the pressure control governor 96 and a predicted pumping command calculation block 114. As with switch 108, it is to be understood that the "switch" 110 is not a physical switch but is rather a software switch in the sense that control computer 58 may control, through a software program, the signal or value to be used as the pump control signal provided on signal path 78 via output OUT2 of control computer 58. In controlling switch 110, control computer 58 is operable to provide either the output of the pressure governor 96 or the output of the predicted pumping command calculation block 114 as the pump command signal on signal path 78. The control computer 58 of FIG. 4 also includes a limp home logic block 112 that receives as an input the accumulator pressure signal provided by pressure sensor 72, and controls switches 108 and 110 in accordance therewith. Control computer 58 also includes a predicted pumping calculation block 114 that receives as inputs the fuel command value provided by engine speed governor 98 and the engine speed signal provided by engine speed sensor 68 on signal path 70, and determines a predicted pump command signal in accordance therewith as will be described in greater detail hereinafter.

Figure 7:
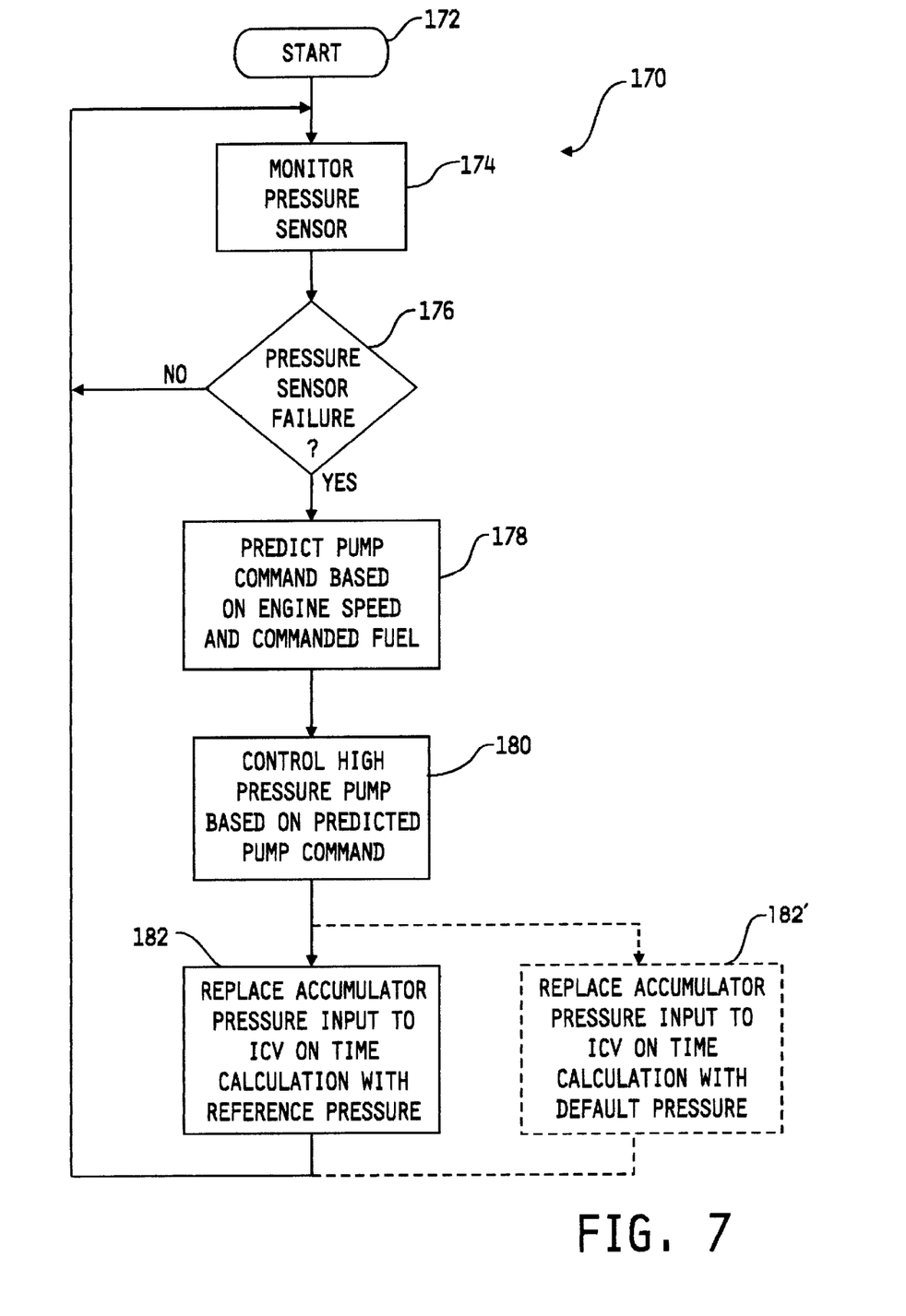
FIG. 7 is a flow chart illustrating one preferred embodiment of a software algorithm for controlling the fuel system in accordance with the block diagram of FIG. 6.

Referring now to FIG. 7, one preferred embodiment of a software algorithm 170 for executing a pressure sensor failure related limp home fueling technique of the present invention is shown. Preferably, control computer 58 includes algorithm 170 therein and is operable to execute algorithm 170 many times per second as is known in the art. With reference to FIGS. 6 and 7, one preferred embodiment for executing a pressure sensor failure related limp home fueling technique will now be described in detail.

Algorithm 170 begins at step 172 and at step 174, the limp home logic block 112 of control computer 58 is operable to monitor accumulator pressure, preferably by monitoring the pressure signal provided by pressure sensor 72 on signal path 74. Algorithm execution continues from step 174 at step 176 control computer 58 is operable to determine whether a pressure sensor failure exists. Control computer 58 is preferably operable to determine whether a pressure sensor failure exists in accordance with any known technique, although one particular technique for determining a stuck in range pressure sensor failure is detailed in pending U.S. patent application Ser. No. 09/033,379 filed by Stavnheim et al. Entitled APPARATUS FOR DIAGNOSING FAILURES AND FAULT CONDITIONS IN A FUEL SYSTEM OF AN INTERNAL COMBUSTION ENGINE and assigned to the assignee of the present invention, the contents of which have been incorporated herein by reference. Another particular technique for determining an erratic pressure sensor failure is detailed in pending U.S. patent application Ser. No. 09/033,378 filed by Hemmerlein et al. Entitled APPARATUS AND METHOD FOR DIAGNOSING ERRATIC PRESSURE SENSOR OPERATION IN A FUEL SYSTEM OF AN INTERNAL COMBUSTION ENGINE and assigned to the assignee of the present invention, the contents of which are incorporated herein by reference. In any event, if control computer 58 determines at step 176 that a pressure sensor failure does not exist, algorithm execution loops back to step 174. If, on the other hand, control computer 58 determines at step 176 that a pressure sensor failure does exist, algorithm execution continues at step 178.

At step 178, the predicted pumping calculation block 114 is operable to produce a predicted pump command based on current engine speed and a current value of the fuel command output of engine speed governor 98. In one embodiment, block 114 includes, or has access to, a look up table having a number of rows or columns of fuel command values and another number of columns or rows of engine speed values or ranges, wherein the table includes predicted pump command values for the various fuel command values and engine speed values or ranges. The predicted pumping calculation block 114 is preferably operable at step 178 to determine an appropriate predicted pump command value from the look up table, either directly or by interpolation. In an alternate embodiment, block 114 includes, or has access to, one or more mathematical equations which define a predicted pump command as a function of current engine speed and current fuel command value. In this case, the predicted pumping calculation block 114 is operable at step 178 to solve the one or more mathematical equations, based on engine speed and fuel command inputs thereto, and determine a predicted pump command value in accordance therewith. In yet another alternate embodiment, block 114 includes, or has access to, one or more graphical representations of predicted pump command values based on engine speed and fuel command values. One example of such a graphical representation is number of waveforms indicative of engine speed values or ranges plotted as a function of fuel command values and predicted pump command values. In this case, the predicted pump command calculation block 114 is operable at step 178 to extract or interpolate from the graph or plot an appropriate predicted pump command value based on current fuel command values and current engine speed values or ranges. In any case, algorithm execution continues from step 178 at step 180.

At step 180, the limp home logic block 112 is operable to control the high pressure fuel pump 22 (FIG. 1) based on the predicted pump command value produced by block 114. Preferably, logic block 112 does so by controlling switch 110 to provide the predicted pump command signal at output OUT2 of control computer 58 rather than the output of pressure governor 96. Thereafter at step 182, logic block 112 is operable to replace the accumulator pressure input to the ICV on time calculation block 100 with the reference pressure provided by reference pressure calculation block 92. Alternatively, algorithm execution may continue from step 180 at step 182' where logic block 112 is operable to replace the accumulator pressure input to the ICV on time calculation block 100 with a predefined default pressure value provided by reference pressure calculation block 92 or by some other portion of control computer 58. In either case, algorithm execution loops back from step 182 or 182' to step 174.

From the foregoing, it should now be apparent that the pressure sensor failure related limp home fueling mode of fuel system 10 is directed at controlling fueling in response to any of a variety of pressure sensor related failure conditions. Control computer 58 is operable in such a limp home fueling mode to monitor the accumulator pressure and replace the pressure governor output with a predicted pump command value as the pump command output provided at output OUT2 of control computer 58.

If a pressure sensor related failure exists, control computer 58 has no way to determine how to operate the high pressure fuel pump 22. In accordance with the present invention, control computer 58 predicts pump command values, based on current engine speed and current fuel command values, and provides the predicted pump command values as the pump command signal at output OUT2 thereof if a pressure sensor failure exists. Additionally, since the ICV on time calculation block uses accumulator pressure as an input thereto, control computer 58 is responsive to a pressure sensor related failure to replace the accumulator pressure input to the ICV on time calculation block with either a reference pressure or default pressure value.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

What is claimed is:

1. Apparatus for controlling a fuel system of an internal combustion engine, comprising:

means for producing a fueling request;

means responsive to said fueling request for producing a reference pressure;

means responsive to said reference pressure for producing a pump command signal;

a fuel pump responsive to said pump command signal for providing high pressure fuel from a lower pressure fuel source;

means responsive to said fueling request for producing a fuel command;

means for sensing engine speed and producing an engine speed signal corresponding thereto; and means responsive to said fuel command and said engine speed signal for replacing said reference pressure with said fuel command in said means for producing said pump command signal if said fuel command exceeds a fuel threshold value while said engine speed signal exceeds a speed threshold level.

2. The apparatus of claim 1 wherein said means for producing a fueling request includes:

an accelerator pedal producing an accelerator pedal signal corresponding to an accelerator pedal position; and means responsive to said accelerator pedal signal for providing said fueling request.

3. The apparatus of claim 2 wherein said means for producing a fueling request includes:

a cruise control unit producing a cruise control signal; and means responsive to said cruise control signal for providing said fueling request.

4. The apparatus of claim 1 further including:

means responsive to said fuel command for producing a fueling signal; and means responsive to said fueling signal for supplying fuel to said engine.

5. The apparatus of claim 4 further including means for sensing fuel pressure in a high fuel pressure portion of a fuel system and producing a fuel pressure signal corresponding thereto;

and wherein said means responsive to said fueling signal for supplying fuel to said engine is further responsive to said fuel pressure signal for supplying fuel to said engine.

6. The apparatus of claim 5 wherein said means for replacing said reference pressure with said fuel command is further responsive to said fuel command and said engine speed signal for removing said fuel command from said means for supplying fuel to said engine if said fuel command exceeds said fuel threshold value while said engine speed signal exceeds a speed threshold value, said means for supplying fuel thereafter responsive only to said fuel pressure signal for supplying fuel to said engine.

7. The apparatus of claim 1 further wherein said means responsive to said fueling request for producing a fuel command includes:

means responsive to said fueling request for producing a reference speed; and means responsive to said reference speed and said engine speed signal for producing said fuel command.

8. The apparatus of claim 1 wherein said means responsive to said reference pressure for producing a pump command signal is further responsive to said fuel pressure signal for producing said pump command signal.

9. The apparatus of claim 4 wherein said means responsive to said fueling signal for supplying fuel to said engine includes:

means responsive to said fueling signal for supplying high pressure fuel; and means for receiving said high pressure fuel and distributing said high pressure fuel to a number of fuel injectors.

10. Apparatus for controlling a fuel system of an internal combustion engine, comprising:

means for producing a fueling request;

means for sensing pressure of pressurized fuel in a fueling system and producing pressure signal corresponding thereto;

means responsive to said fueling request and said pressure signal for producing a pump command signal;

a fuel pump responsive to said pump command signal for providing high pressure fuel from a lower pressure fuel source;

means responsive to said fueling request for producing a fuel command;

means for sensing engine speed and producing an engine speed signal corresponding thereto; and means responsive to said pressure signal for replacing said pump command signal to said fuel pump with a predicted pump command signal if said pressure signal indicates abnormal operation of said means for sensing pressure.

11. The apparatus of claim 10 wherein said means for producing a fueling request includes:

an accelerator pedal producing an accelerator pedal signal corresponding to an accelerator pedal position; and means responsive to said accelerator pedal signal for providing said fueling request.

12. The apparatus of claim 11 wherein said means for producing a fueling request includes:

a cruise control unit producing a cruise control signal; and means responsive to said cruise control signal for providing said fueling request.

13. The apparatus of claim 12 wherein said means responsive to said fueling request and said pressure signal for producing a pump command signal includes:

means responsive to said fueling request for producing a reference pressure; and means responsive to said reference pressure and said pressure signal for producing said pump command.

14. The apparatus of claim 10 further including:

means responsive to said fuel command and said pressure signal for producing a fueling signal; and means responsive to said fueling signal for supplying fuel to said engine.

15. The apparatus of claim 14 wherein said means for replacing said pump command signal to said fuel pump with a predicted pump command signal is further responsive to said pressure signal for replacing said pressure signal with said reference pressure in said means for producing a fueling signal if said pressure signal indicates abnormal operation of said means for sensing pressure.

16. The apparatus of claim 14 wherein said means for replacing said pump command signal with a predicted pump command signal is further responsive to said pressure signal for replacing said pressure signal with a default pressure value in said means for producing a fueling signal if said pressure signal indicates abnormal operation of said means for sensing pressure.

17. The apparatus of claim 10 further including means responsive to said fuel command and said engine speed signal for producing said predicted pump command signal.

18. The apparatus of claim 10 wherein said means responsive to said fueling request for producing a fuel command includes:

means responsive to said fueling request for producing a reference speed; and means responsive to said reference speed and said engine speed signal for producing said fuel command.

19. The apparatus of claim 14 wherein said means responsive to said fueling signal for supplying fuel to said engine includes:

means responsive to said fueling signal for supplying high pressure fuel; and means for receiving said high pressure fuel and distributing said high pressure fuel to a number of fuel injectors.

20. Apparatus for controlling a fuel system of an internal combustion engine, comprising:

a high pressure fuel pump responsive to a pump command signal for providing high pressure fuel from a lower pressure source of fuel;

an accumulator receiving said high pressure fuel from said fuel pump and collecting said high pressure fuel therein;

means for sensing engine speed and producing an engine speed signal corresponding thereto; and a control computer responsive to a fuel request signal and said engine speed signal to produce a fuel command, said control computer producing said pump command signal as a function of said fuel command if said fuel command exceeds a fuel threshold level while said engine speed signal is in excess of a speed threshold level.

21. The apparatus of claim 20 further including an accelerator pedal producing an accelerator pedal signal corresponding to an accelerator pedal position;

and wherein said control computer includes means responsive to said accelerator pedal signal for producing said fueling request.

22. The apparatus of claim 20 further including a cruise control unit producing a cruise control signal;

and wherein control computer includes means responsive to said cruise control signal for producing said fueling request.

23. The apparatus of claim 21 wherein said control computer includes means responsive to said fueling request for producing a reference speed; and means responsive to said reference speed and said engine speed signal for producing said fuel command.

24. The apparatus of claim 20 wherein said accumulator includes a means for sensing pressure of said high pressure fuel collected therein and producing a pressure signal corresponding thereto.

25. The apparatus of claim 24 further including means responsive to a fueling signal for supplying fuel to said engine;

and wherein said control computer includes means responsive to said fuel command and said pressure signal for producing said fueling signal.

26. The apparatus of claim 25 wherein said control computer includes means responsive to said fuel command and said engine speed signal for removing said fuel command from said means for producing said fueling signal if said fuel command exceeds said fuel threshold value while said engine speed signal is in excess of said speed threshold value, said means for producing said fueling signal thereafter responsive only to said fuel pressure signal for producing said fueling signal.

27. The apparatus of claim 25 further including means responsive to said fueling signal for transferring high pressure fuel from said accumulator to a high pressure fuel disbursement means.

28. Apparatus for controlling a fuel system of an internal combustion engine, comprising:

a high pressure fuel pump responsive to a pump command signal for providing high pressure fuel from a lower pressure source of fuel;

an accumulator receiving said high pressure fuel from said fuel pump and collecting said high pressure fuel therein;

means for sensing fuel pressure within said accumulator and producing a pressure signal corresponding thereto;

means for producing a fuel request signal;

means for sensing engine speed and producing an engine speed signal corresponding thereto; and a control computer responsive to said fuel request signal to produce a fuel command, said control computer responsive to an abnormality in said pressure signal to provide said pump command signal as a function of said engine speed signal and said fuel command.

29. The apparatus of claim 28 further including an accelerator pedal producing an accelerator pedal signal corresponding to an accelerator pedal position;

and wherein said control computer includes means responsive to said accelerator pedal signal for producing said fueling request.

30. The apparatus of claim 28 further including a cruise control unit producing a cruise control signal;

and wherein control computer includes means responsive to said cruise control signal for producing said fueling request.

31. The apparatus of claim 28 wherein said control computer includes means responsive to said fueling request for producing a reference pressure; and means responsive to said reference pressure and said pressure signal for producing said pump command signal.

32. The apparatus of claim 31 further including means responsive to a fueling signal for supplying fuel to said engine;

and wherein said control computer includes means responsive to said fuel command and said pressure signal for producing said fueling signal.

33. The apparatus of claim 32 wherein said control computer includes means responsive to said pressure signal for replacing said pressure signal with said reference pressure in said means for producing a fueling signal if said pressure signal indicates abnormal operation of said means for sensing fuel pressure.

34. The apparatus of claim 32 wherein said control computer includes means responsive to said pressure signal for replacing said pressure signal with a default pressure in said means for producing a fueling signal if said pressure signal indicates abnormal operation of said means for sensing fuel pressure.

35. The apparatus of claim 32 further including means responsive to said fueling signal for transferring high pressure fuel from said accumulator to a high pressure fuel disbursement means.

* * * * *